United States Patent
Tsujimoto

[19]

[11] Patent Number: 6,154,618
[45] Date of Patent: Nov. 28, 2000

[54] DATA RECORDING APPARATUS ADAPTED FOR CAMERA, AND CAMERA HAVING THE SAME

[75] Inventor: Shinichi Tsujimoto, Machida, Japan

[73] Assignee: Canon Kabushiki Kaisha, Tokyo, Japan

[21] Appl. No.: 09/361,191

[22] Filed: Jul. 26, 1999

[30] Foreign Application Priority Data

Jul. 31, 1998 [JP] Japan .................................. 10-229525

[51] Int. Cl.[7] .................................................. G03B 17/24
[52] U.S. Cl. ........................................................ 396/319
[58] Field of Search .................................. 396/311, 319, 396/310, 315, 318

[56] References Cited

U.S. PATENT DOCUMENTS 4,705,372  11/1987  Lapeyre .................................. 396/318
5,666,186   9/1997  Meyerhoefer et al. ............. 396/310 X Primary Examiner—W. B. Perkey
Attorney, Agent, or Firm—Robin, Blecker & Daley

[57] ABSTRACT

A camera capable of recording, on an image recording medium, a desired title selected from among a great number of kinds of titles while minimizing a recording capacity on the recording medium includes a recording device which records data on the image recording medium, and a data recording control device which causes the recording device to perform (i) a first recording operation for recording, on the image recording medium, title data of a first type composed of a numeric code which has compatibility with an external apparatus and is defined as a title composed of a plurality of characters, and (ii) a second recording operation for recording, on the image recording medium, title data of a second type formed by combining a plurality of character codes each of which is defined to correspond to one character in conformity to a predetermined character standard. The title data of the first type and the title data of the second type are stored beforehand in a memory provided in the camera.

17 Claims, 18 Drawing Sheets

F I G. 4
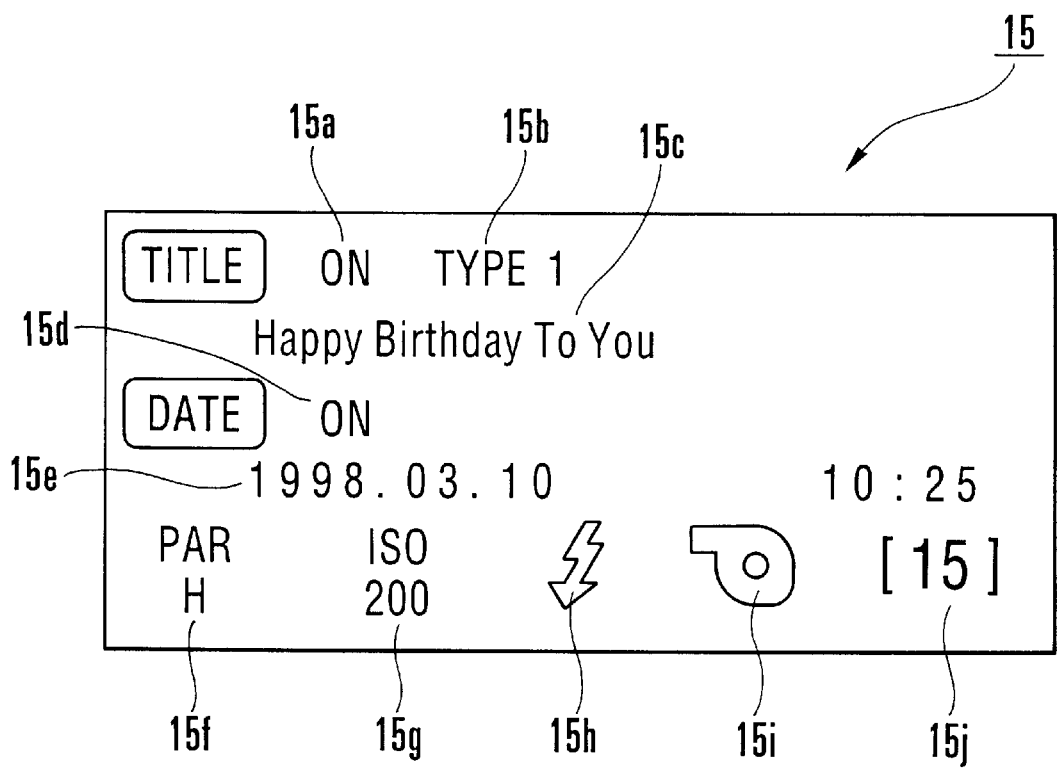

FIG. 6

| ADDRESS | TYPE OF TITLE | NUMERIC CODE | CONTENT OF TITLE | AMOUNT OF RECORDING DATA [Byte] |
|---|---|---|---|---|
| 00h | 1 | 00 | Birthday | 1 |
| 01h | 1 | 01 | Happy Birthday To You | 1 |
| 02h | 1 | 02 | Happy Birthday | 1 |
| 03h | 2 | — | Father's Birthday | 16 |
| 04h | 2 | — | Mother's Birthday | 17 |
| 05h | 2 | — | Older Sister's Birthday | 23 |
| 06h | 2 | — | Older Brother's Birthday | 24 |
| 07h | 2 | — | Younger Sister's Birthday | 25 |
| 08h | 2 | — | Younger Brother's Birthday | 26 |
| 09h | 2 | — | Birthday Party | 14 |
| 0Ah | 1 | 03 | Very Happy! | 1 |
| 0Bh | 1 | 04 | Doing Best! | 1 |
| 0Ch | 2 | — | Fight! | 6 |
| 0Dh | 2 | — | You Have Done It! | 17 |
| ... | ... | ... | ... | ... |

F I G. 7
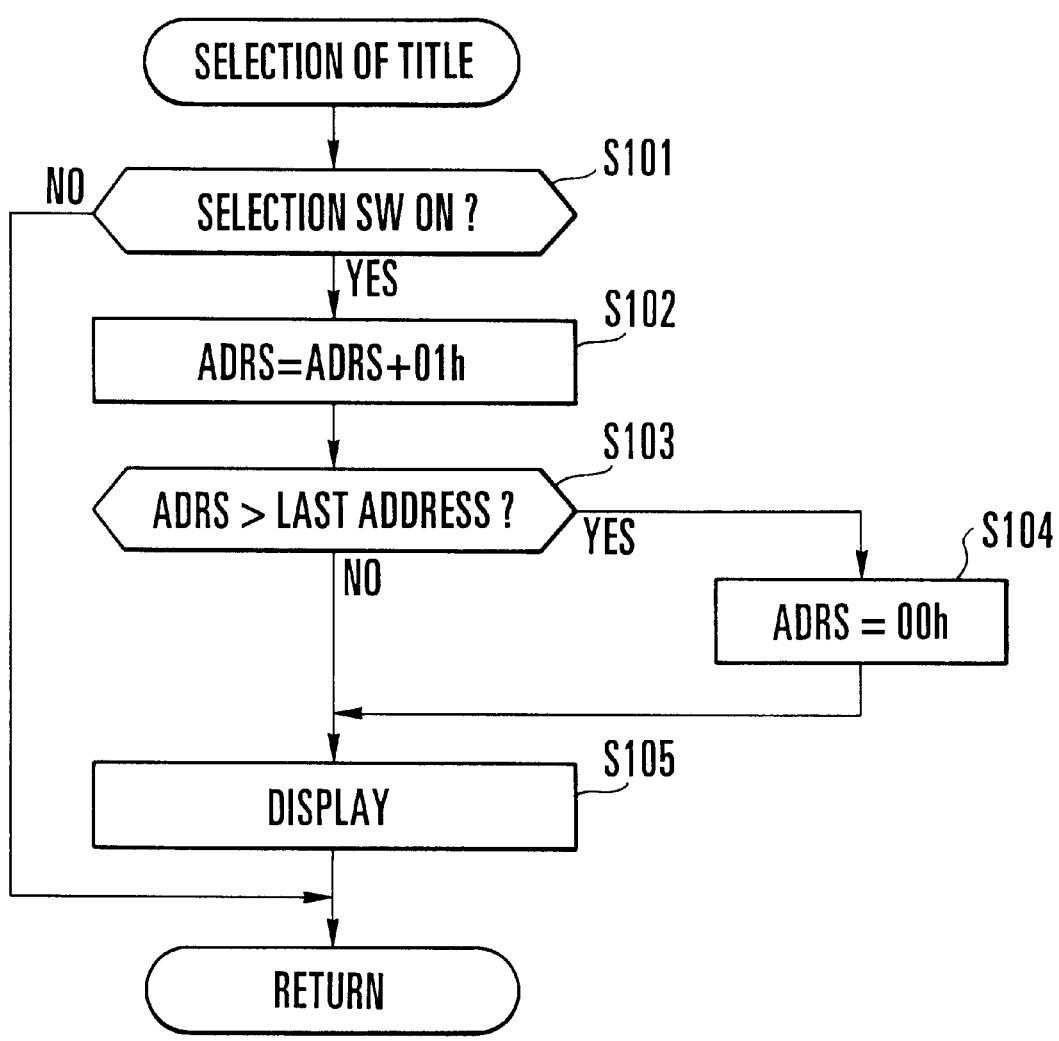

FIG.12(a)

TITLE OF FIRST TYPE

| ADDRESS (ADRS1) | NUMERIC CODE | CONTENT OF TITLE |
|---|---|---|
| 00h | — | No Recording (OFF) |
| 01h | 00 | Birthday |
| 02h | 01 | Happy Birthday To You |
| 03h | 02 | Happy Birthday |
| 04h | 03 | Very Happy! |
| 05h | 04 | Doing Best! |
| ... | ... | ... |
| 4Fh | 79 | |

FIG.12(b)

TITLE OF SECOND TYPE

| ADDRESS (ADRS2) | CONTENT OF TITLE |
|---|---|
| 80h | No Recording (OFF) |
| 81h | Father's Birthday |
| 82h | Mother's Birthday |
| 83h | Older Sister's Birthday |
| 84h | Older Brother's Birthday |
| 85h | Younger Sister's Birthday |
| ... | ... |
| BFh | |

| DATE | ADDRESS | TYPE OF TITLE | NUMERIC CODE | CONTENT OF TITLE | AMOUNT OF RECORDING DATA [Byte] |
|---|---|---|---|---|---|
| NO APPLICABLE DAY | 00h | — | — | NO RECORDING | — |
| Jan. 1st | 01h | 2 | — | New Year's Day | 14 |
| Jan. 2nd | 02h | 1 | 07 | Happy New Year | 1 |
| Jan. 3rd | 03h | 1 | 07 | Happy New Year | 1 |
| Jan. 15th | 04h | 1 | 08 | Coming-of-Age Day | 1 |
| . . . | . . . | . . . | . . . | . . . | . . . |
| Feb. 11th | 08h | 2 | — | National Foundation Day | 23 |
| Feb. 14th | 09h | 1 | 11 | Valentine's Day | 1 |
| Mar. 3rd | 0Ah | 1 | 12 | Girls' Festival Day | 1 |
| Mar. 14th | 0Bh | 2 | — | White Day | 9 |
| Mar. 21st | 0Ch | 2 | — | Vernal Equinox Day | 18 |
| Apr. 1st | 0Dh | 2 | — | April Fools' Day | 16 |
| Apr. 12th | 0Eh | 1 | 13 | Easter | 1 |
| Apr. 29th | 0Fh | 2 | — | Greenery Day | 12 |
| . . . | . . . | . . . | . . . | . . . | . . . |
| Dec. 24th | 40h | 2 | — | Christmas Eve | 13 |
| Dec. 25th | 41h | 1 | 26 | Christmas | 1 |
| Dec. 31st | 42h | 2 | — | New Year's Eve | 14 |

DATA RECORDING APPARATUS ADAPTED FOR CAMERA, AND CAMERA HAVING THE SAME

BACKGROUND OF THE INVENTION

1. Field of the Invention

The present invention relates to an improvment on a data recording apparatus adapted for a camera having a recording device for recording data, such as a title of an image, on a recording medium, and also to an improvement on a camera having such a data recording apparatus.

2. Description of Related Art

In photo-taking an image, it is advantageous to have some title apposite to the image recorded along with the image. Titles thus recorded are useful in reviewing images or pictures in prints or on a picture display made by a CRT or the like. Besides, such titles enhance the memorial value of the images recorded. The cameras of the kind having devices for recording titles along with images have been developed in various manners.

In Japanese Laid-Open Patent Application No. Hei 8-292478, there is disclosed a camera arranged to prestore a plurality of ready-made titles together with numeric codes of the respective titles. This camera permits selection of one of the ready-made titles by means of a selection switch so as to have the title recorded along with an applicable image on a photographic film. The title selected is magnetically recorded on the photographic film in a numeric code which corresponds to the title. Then, the numeric code recorded on the photographic film is reproduced by a photograph printer and is converted into a title (character information) corresponding to the numeric code. The photograph printer thus prints the title on a photograph print.

Further, in Japanese Laid-Open Patent Application No. Hei 9-22056, there is disclosed a camera arranged to permit the camera user to prepare a desired title (hereinafter referred to as an arbitrary title), instead of a ready-made title, by using a keyboard having a plurality of keys. With the arbitrary title thus prepared, the camera records the arbitrary title on a photographic film in a character code formed by using one byte for each character.

Further, in Japanese Laid-Open Patent Application No. Hei 8-54678, there are disclosed a camera capable of handling both the ready-made titles and arbitrary titles, a method for displaying such titles and a method for preparing such titles.

Further, in Japanese Utility Model Publication No. Hei 6-45944, there is disclosed a camera which is provided with means for preparation of an arbitrary title, means for correlating the arbitrary title with a specific date or time, and clock means. According to the arrangement of the camera disclosed, upon arrival of the specific date or time, the arbitrary title is imprinted on a photographic film. This technique is disclosed also in Japanese Laid-Open Patent Application No. Hei 8-171134.

Further, in Japanese Laid-Open Patent Application No. Hei 6-303522, there is disclosed a camera-integrated video tape recorder (called a camcorder) which is provided with clock means and is arranged to preferentially display such a ready-made title that suits to the result of a time count made by the clock means.

The camera disclosed in the above Japanese Laid-Open Patent Application No. Hei 8-292478 permits the camera user to have a title recorded with a simple operation by just selecting a desired title from among the prestored ready-made titles at the time of taking a photograph. Another advantage of the camera lies in that, since the title is recorded in a numeric code which corresponds to the title, the title can be recorded within a relatively small recording space, i.e., with a relatively small recording capacity. However, the recordable titles are limited to such titles that are acceptable by a photograph printer in respect of correlation between numeric codes and titles. Therefore, according to the arrangement of the camera, only impersonal titles are recordable.

Further, the camera disclosed in the above Japanese Laid-Open Patent Application No. Hei 9-22056 permits recording an arbitrary title. With that camera, therefore, personal titles can be recorded. However, since characters forming the arbitrary title must be inputted one by one, the title input operation is not simple and requires much labor. Further, since one byte must be used for recording one character, recording one title as a whole always requires use of a large recording space.

Further, the camera disclosed in the above Japanese Laid-Open Patent Application No. Hei 8-54678 is arranged to be capable of handling both the ready-made titles and the arbitrary titles as desired. However, that camera also necessitates the camera user to perform a troublesome operation in inputting an arbitrary title.

Further, in the cases of cameras disclosed in the above Japanese Utility Model Publication No. Hei 6-64544 and the above Japanese Laid-Open Patent Application No. Hei 8-171134, a specific title is automatically recorded upon arrival of a specific date or time. Those cameras thus excel in operability for title recording. However, they also necessitate a troublesome operation in inputting an arbitrary title and in setting a specific date and/or time. They have another shortcoming in that, since the titles are arranged to be optically imprinted on a photographic film, only such a title that consists of a few characters can be imprinted. A further shortcoming lies in that, once a title is recorded, the title cannot be corrected nor deleted later.

BRIEF SUMMARY OF THE INVENTION

In accordance with one aspect of the invention, there is provided a data recording apparatus adapted for a camera, or a camera, which comprises a recording device which records data on an image recording medium, and a data recording control device which causes the recording device to perform (i) a first recording operation for recording, on the image recording medium, title data of a first type composed of a numeric code which has compatibility with an external apparatus and is defined as a title composed of a plurality of characters, and (ii) a second recording operation for recording, on the image recording medium, title data of a second type formed by combining a plurality of character codes each of which is defined to correspond to one character in conformity to a predetermined character standard.

The above and other aspects and features of the invention will become apparent from the following detailed description of preferred embodiments thereof taken in connection with the accompanying drawings.

BRIEF DESCRIPTION OF THE SEVERAL VIEWS OF THE DRAWING

FIG. 4 is a diagram showing the contents of display to be made by a display device of the camera according to the first embodiment of the invention.

FIG. 6 is a table showing the contents of titles prestored in a ROM of the camera according to the first embodiment of the invention.

FIG. 7 is a flow chart showing a title selecting operation of the camera according to the first embodiment of the invention.

FIGS. 12(a) and 12(b) are tables showing the contents of titles prestored in a ROM of the camera according to the second embodiment of the invention.

FIG. 16 is a diagram showing the contents of display to be made by a display device of a camera according to a third embodiment of the invention.

FIG. 17 is a table showing the contents of titles prestored in a ROM of the camera according to the third embodiment of the invention.

DETAILED DESCRIPTION OF THE INVENTION

Hereinafter, preferred embodiments of the invention will be described in detail with reference to the drawings.

Figure 1:
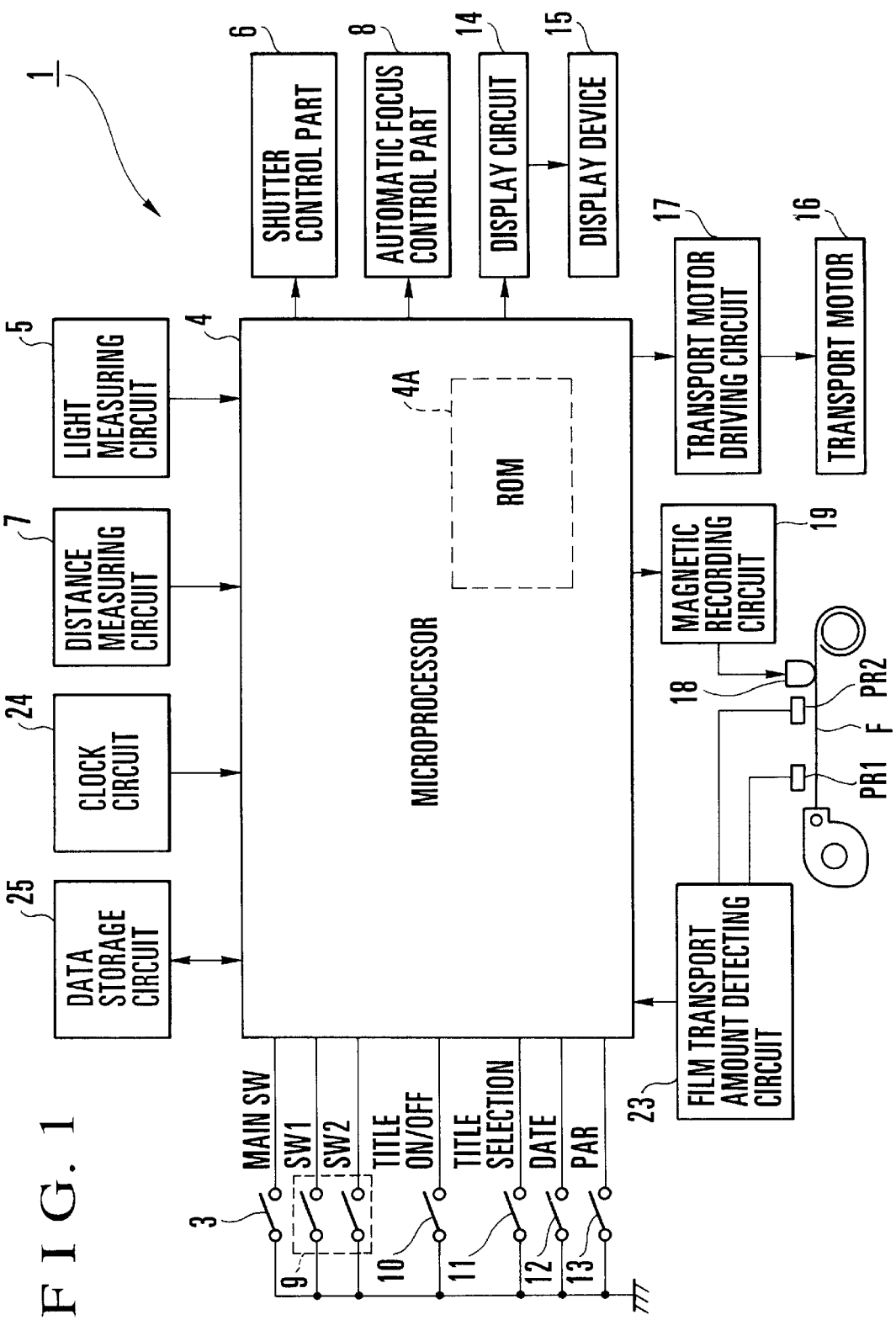
FIG. 1 is a block diagram showing the circuitry arrangement of a camera according to a first embodiment of the invention.
Figure 2:
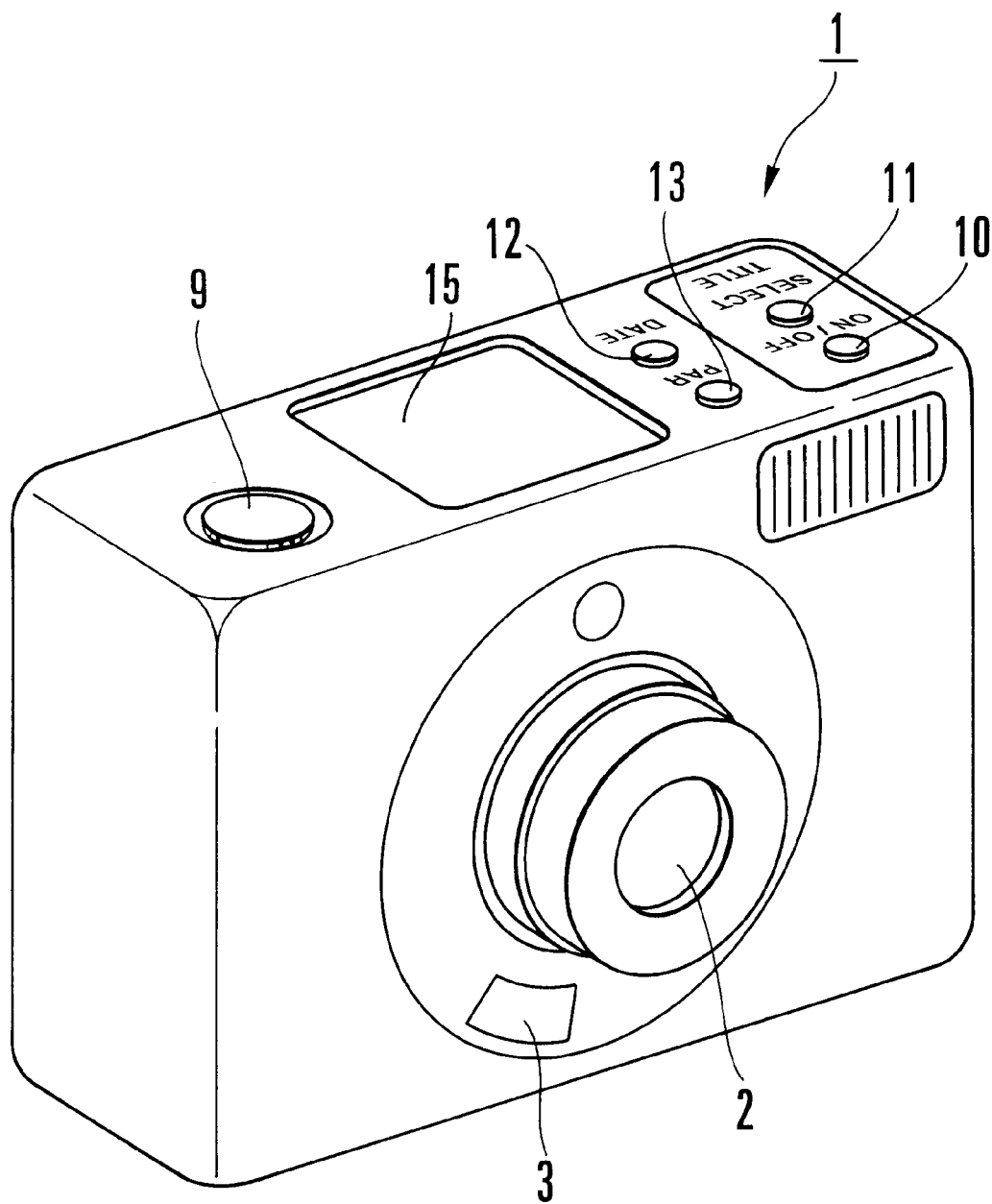
FIG. 2 is a perspective view of the camera according to the first embodiment of the invention.
Figure 3:
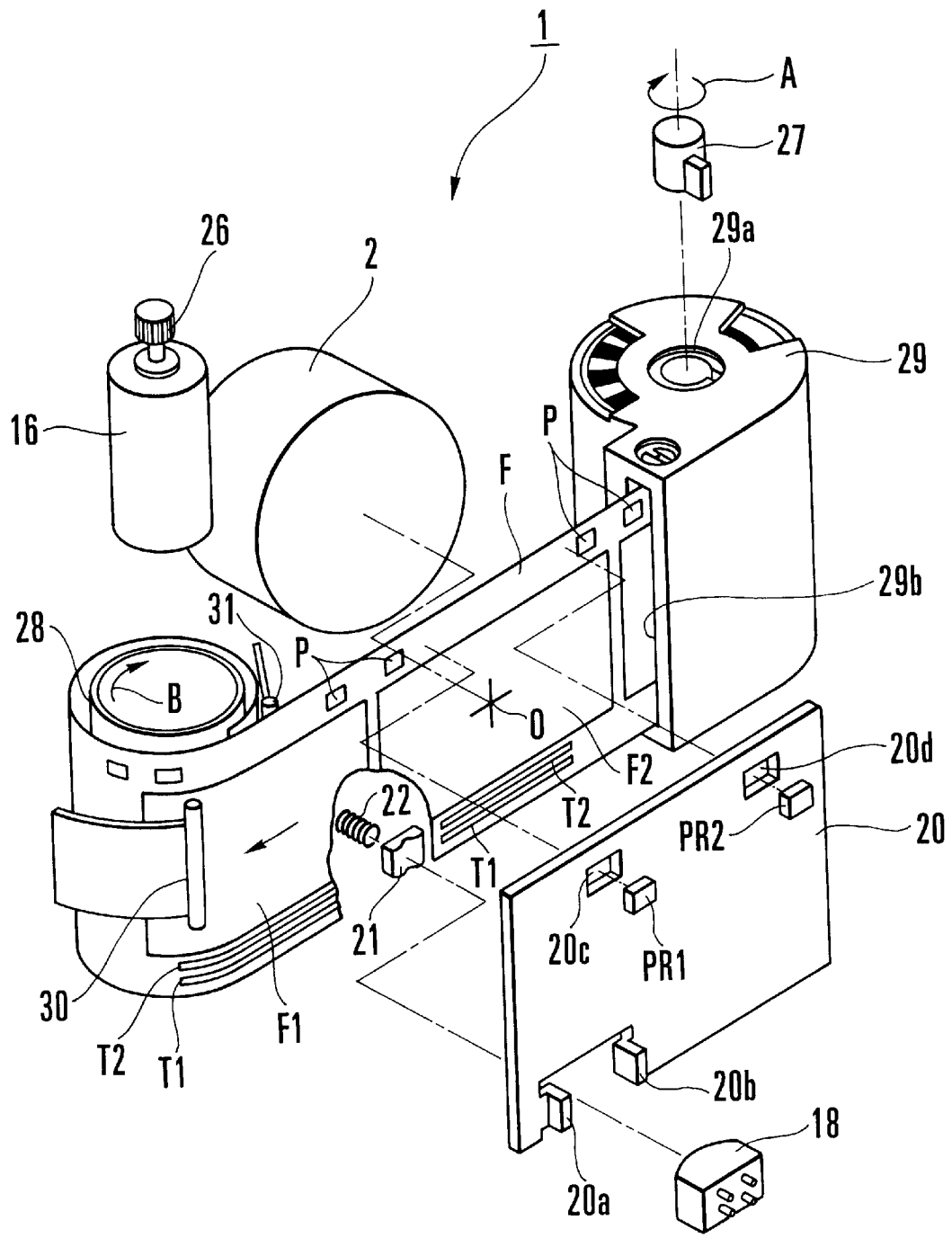
FIG. 3 is an exploded perspective view showing the internal arrangement of the camera according to the first embodiment of the invention.
Figure 8:
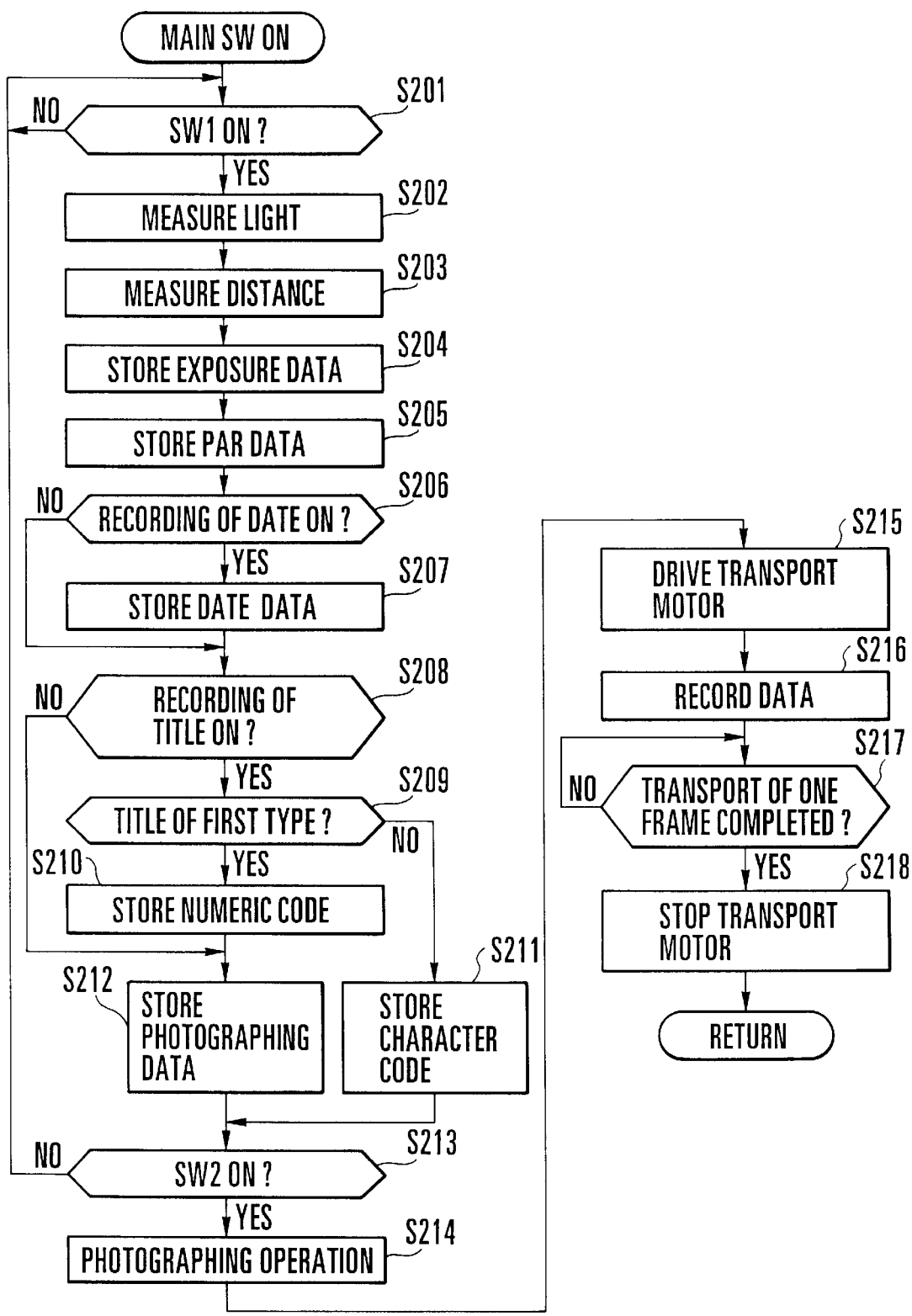
FIG. 8 is a flow chart showing a sequence of operations of the camera according to the first embodiment of the invention.
Figure 9:
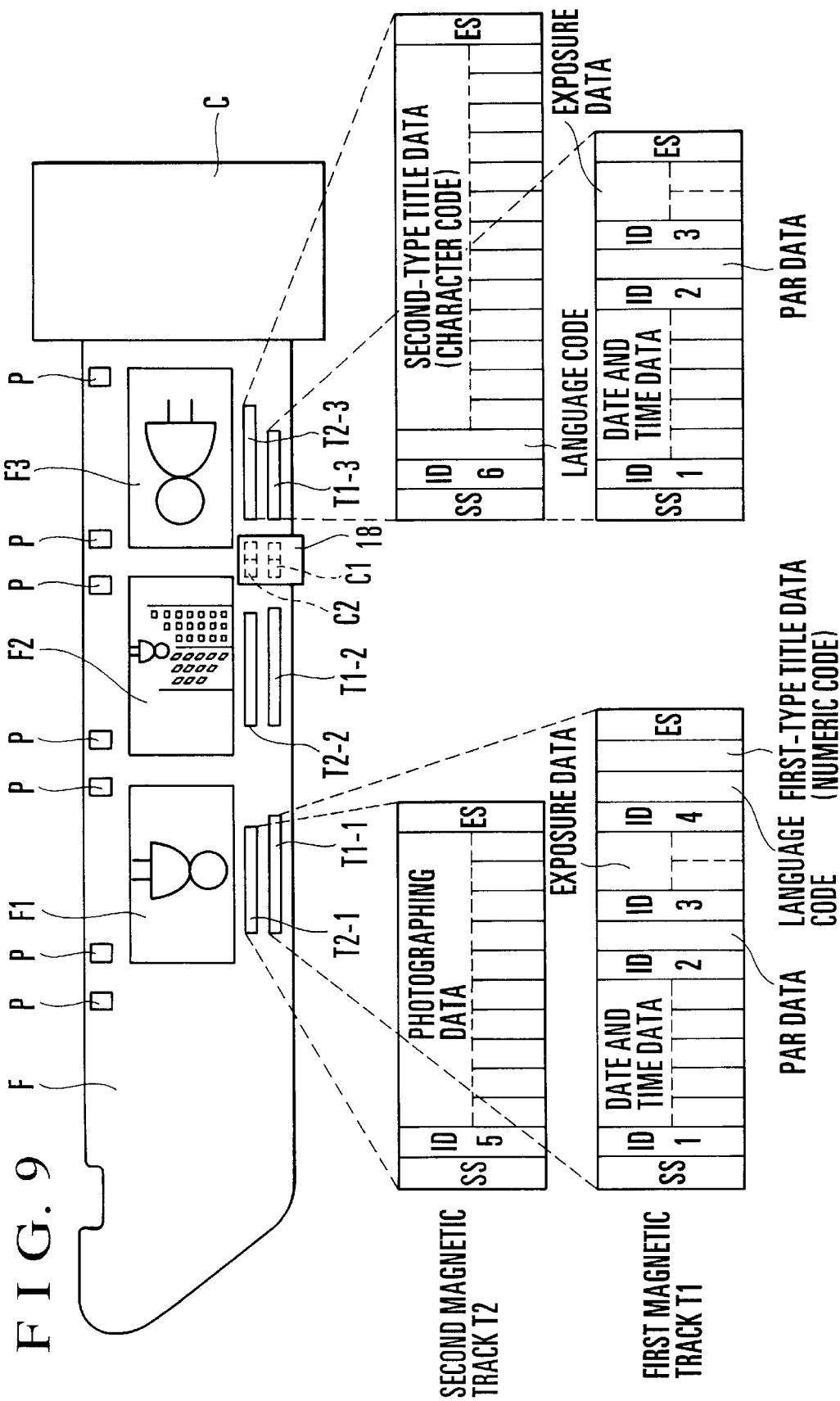
FIG. 9 is a diagram for explaining a recording operation of the camera according to the first embodiment of the invention.

FIGS. 1 to 9 relate to a first embodiment of the invention. Of these figures, FIG. 1 is a block diagram showing the circuitry arrangement of a camera according to the first embodiment of the invention, FIG. 2 shows the appearance of the camera, FIG. 3 shows the internal arrangement of the camera, FIG. 4 shows the contents of display to be made by a display device provided on the camera shown in FIG. 2, FIGS. 5(a) and 5(b) show the appearance and the internal structure of a magnetic head included in the camera, FIG. 6 is a table showing the contents of titles recorded beforehand in a ROM shown in FIG. 1, FIG. 7 is a flow chart showing a title selecting operation to be performed by the camera according to the first embodiment, FIG. 8 is a flow chart showing a sequence of operations to be performed by the camera according to the first embodiment of the invention, and FIG. 9 is a diagram aiding in explaining a recording operation to be carried out by the camera according to the first embodiment of the invention.

The arrangement of the camera according to the first embodiment of the invention is first described with reference to FIG. 1 to FIGS. 5(a) and 5(b) as follows.

Referring to FIG. 1 to FIGS. 5(a) and 5(b), the illustrations include a camera 1, a photo-taking lens 2, and a main switch 3 of the camera 1. The camera 1 is provided with a microprocessor 4. The microprocessor 4 has a ROM 4A and a RAM (not shown). All operations, displays, etc., of the camera 1 are controlled according to a program stored within the microprocessor 4. Each of various mechanisms of the camera 1 and the photo-taking lens 2 operates in accordance with the instruction of the microprocessor 4.

A light measuring circuit 5 is arranged to detect the luminance of an object of shooting and send information thereon to the microprocessor 4 in taking a shot. A shutter control part 6 is arranged to control the operation of a shutter in taking a shot according to an instruction given from the microprocessor 4 on the basis of an input from the light measuring circuit 5. A distance measuring circuit 7 is arranged to detect a distance to the object and send information on the distance measured to the microprocessor 4 in taking a shot. An automatic focus control part 8 is arranged to control an automatic focusing operation of the photo-taking lens 2 according to an instruction given from the microprocessor 4 on the basis of an input from the distance measuring circuit 7.

The camera is provided with a release button 9. When a switch SW1 is turned on by the first stroke of the release button 9, the light measuring action of the light measuring circuit 5 and the distance measuring action of the distance measuring circuit 7 are started. When a switch SW2 is turned on by the second stroke of the release button 9, the shutter control part 6 is caused to perform a photo-taking exposure action. A title recording on/off switch 10 is provided for inputting an instruction as to whether a title is to be recorded at the time of taking a shot. A title selection switch 11 is provided for selecting a desired title. A date switch 12 is provided for selecting one of the recording of date, the recording of time and the non-recording. A PAR switch 13 is provided for selecting an aspect ratio of a print as desired.

The word "PAR" is an abbreviation for "print aspect ratio". In the case of the first embodiment of the invention, one of three print aspect ratios can be selected as desired. The three print aspect ratios include an aspect ratio C which is 3:2, an aspect ratio H which is 16:9 and an aspect ratio P which is 3:1. Information on the selected title, date or time and PAR is recorded on the photographic film at the time of taking a shot as will be described below, and is afterward reproduced by a photograph printer. At the photograph printer, the title and date or time are printed either on the surface or on the reverse side of a photographic print on the basis of the reproduced information about the title and date or time. Further, on the basis of the reproduced PAR information, the paper size, the printing range and the print magnification of the photographic print are decided.

A display circuit 14 is arranged to drive a display device 15 to display thereon various states of the camera. The display device 15 is an LCD or the like, and, as shown in FIG. 4, includes a title on/off display part 15a which shows whether or not the title recording function of the camera is in an on-state or in an off-state, a title type display part 15b which shows which of first and second types of titles is selected, a title display part 15c which shows the content of a title selected, a date-time on/off display part 15d which shows whether the date-time recording function is in an on-state or in an off-state, a date-time display part 15e, an aspect ratio display part 15f which shows an aspect ratio selected, an ISO display part 15g which shows the ISO sensitivity value of the film, a flash mode display part 15h which shows a light emitting mode of the flash device, a cartridge presence/absence display part 15i which shows whether the camera is loaded with a film cartridge or not, and a frame counter display part 15j.

The camera has a film transport motor 16. A transport motor driving circuit 17 is arranged to drive the film transport motor 16. A magnetic head 18 is arranged to perform magnetic recording on the film F. A magnetic recording circuit 19 is arranged to drive the magnetic head 18 in recording. A pressure plate 20 (see FIG. 3) is mounted on a camera body (not shown) for the purpose of keeping adequate flatness of the film F. The magnetic head 18 is mounted on the pressure plate 20 by being bonded to bent-up parts 20a and 20b of the pressure plate 20. A pad member 21 is made of a plastic material or the like. A spring 22 is arranged to exert an urging force on the pad member 21. The pad member 21. and the spring 22 are arranged to push the base surface of the film F (a front side of the film F as viewed in FIG. 3) having a magnetic recording layer against the magnetic head 18. Under this pushing action, the magnetic head 18 and the base surface of the film F are kept in a tightly contacting state to ensure that the magnetic recording is adequately carried on during the process of transporting the film F.

Figure 5A:
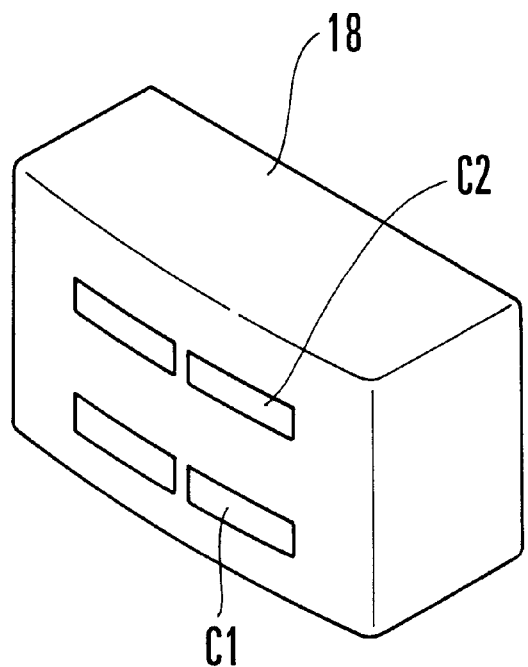
FIGS. 5(a) and 5(b) are perspective views respectively showing the appearance and the internal structural arrangement of a magnetic head of the camera according to the first embodiment of the invention.
Figure 5B:
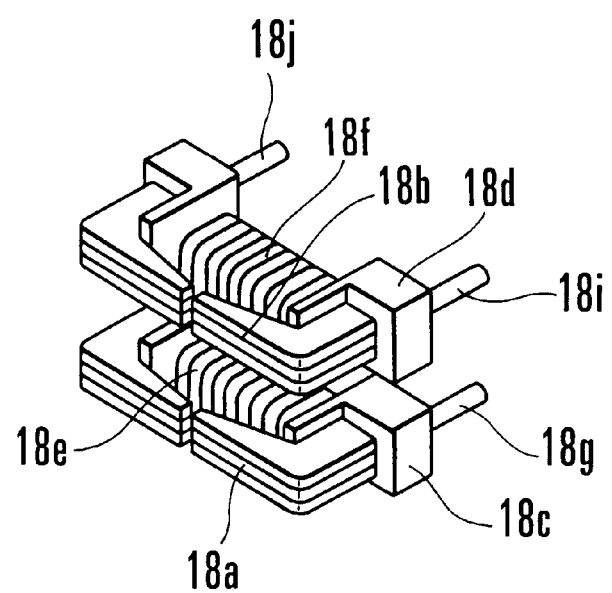

In FIG. 3, reference symbols T1 and T2 denote two magnetic tracks formed on the base surface of the film F by the recording action of the magnetic head 18 for each of photo-taking frames F1, F2, F3, As shown in FIG. 5(a), the magnetic head 18 has two recording channels C1 and C2. As shown in FIG. 5(b), each of the channels C1 and C2 is composed of a core 18a or 18b, a bobbin 18c or 18d, a coil 18e or 18f which is wound around the bobbin 18c or 18d, and terminals 18g and 18h (not shown) or 18i and 18j. Different recording contents can be recorded respectively by the channels C1 and C2 by applying recording currents to the coils 18e and 18f.

Photo-reflectors PR1 and PR2 (see FIGS. 1 and 3), which are connected to a film transport amount detecting circuit 23, are arranged to detect passing of perforations P of the film F. The detection signals obtained by the film transport amount detecting circuit 23 from the outputs of the photo-reflectors PR1 and PR2 are supplied to the microprocessor 4. The photo-reflectors PR1 and PR2 detect the perforations P of the film F through holes 20c and 20d provided in the pressure plate 20. A clock circuit 24 is arranged to produce date and time data. A data storage circuit 25 is arranged to temporarily store data to be recorded on the film F by the magnetic head 18.

Now, the structural arrangement for transporting the film F is described below with reference mainly to FIG. 3.

When the film transport motor 16 rotates in a first direction, the rotation of a pinion gear 26 is transmitted through a transmission mechanism (not shown) to cause a spool driver 27 through a one-way clutch or the like to rotate in the direction of arrow A and also to cause a take-up spool 28 to rotate in the direction of arrow B. The rotation of the spool driver 27 in the direction of arrow A causes a spool 29a to rotate. The rotation of the spool 29a causes the fore end of the film F which is disposed inside a film cartridge 29 to be sent out from a film exit part 29b of the film cartridge 29. Upon arrival of the fore end of the film F at the take-up spool 28, the film F is taken up to become ready for being wound around the take-up spool 28. In this instance, power transmission for the film sending-out action of the spool driver 27 is cut off by a known one-way clutch or the like. The film transport motor 16 is disposed inside the take-up spool 28. Guide rollers 30 and 31 are arranged to guide the film F in such a way as to allow the fore end of the film F to be wound around the take-up spool 28 without fail. When the film transport motor 16 rotates in a second direction, the spool driver 27 is rotated in a direction opposite to the direction of arrow A, so that the film F is rewound. In FIG. 3, reference symbol O denotes a photo-taking center of the photo-taking lens 2, i.e., the center of the photo-taking aperture of the camera.

Next, the contents of the titles prestored within the ROM 4A of the camera are described in detail below with reference to FIG. 6.

FIG. 6 shows, for each title, the address on the ROM 4A indicated in hexadecimal digits, the type of the title, the numeric code assigned to the title, the content of the title, and the amount of recording data required for recording the title.

The titles are divided into titles of a first type and titles of a second type. The titles of the first type are assigned the respective numeric codes. When a title of the first type is selected, the corresponding numeric code is recorded on the recording medium. The recorded numeric code is afterward reproduced by a photograph printer, a CRT monitor apparatus or the like. A title which corresponds to the reproduced numeric code is restored to its original state through a conversion table included in the reproducing apparatus. Then, the title is, for example, either printed on the surface or on the reverse side of a photographic print or displayed on a CRT monitor.

As mentioned above, the titles of the first type have compatibility, in numeric codes, with the reproducing apparatuses to be used after photo-taking, such as a photograph printer or a CRT monitor apparatus or the like. The titles of the first type thus have universality and are commonly usable. An advantage of the titles of the first type lies in that each of them can be recorded with a recording data amount of only one byte since only a numeric code is recorded.

Each of the titles of the second type is recorded on the recording medium in a character code formed, as a character string, to have one byte for one character according to ISO 646 (an example of character standards) or the like. Each recorded character code is afterward reproduced by a photograph printer, a CRT monitor apparatus the like. The character code is then restored to the original character string to be printed on the surface or reverse side of a photograph print or to be displayed, for example, on a CRT monitor.

As mentioned above, the titles of the second type have compatibility, in character codes, with the reproducing apparatuses to be used after photo-taking, such as a photograph printer or a CRT monitor apparatus or the like. The titles of the second type are thus suited for selection of a title of a personal kind. Since one byte is necessary for recording one character, the title of the second type requires a relatively large amount of recording data.

Next, an operation to be performed in selecting a desired title is described with reference to the flow chart of FIG. 7.

At a step S101 of FIG. 7, a check is made to find if the title selection switch 11 has been turned on. If not, the flow of operation returns to its start. If so, the flow proceeds to a step S102. At the step S102, an address is set by incrementing by one an address which has been set beforehand or set last time. The flow then proceeds from the step S102 to a step S103.

At the step S103, a check is made to find if the set address is larger than the last address shown in FIG. 6. If not, the flow proceeds to a step S105. At the step S105, a display is made to show, according to the contents of the ROM 4A shown in FIG. 6, the type of the title and the content of the title at the incremented address respectively at the display parts 15b and 15c of the display device 15. The flow then returns to the start.

If the address is found at the step S103 to be larger than the last address, the flow proceeds from the step S103 to a step S104. At the step S104, a leading address "00h" is set, and the flow proceeds to the step S105. At the step S105, the type of the title ("TYPE 1" in this case) and the content of the title ("Birthday" in this case) corresponding to the leading address are displayed by the display device 15, and the flow returns to the start.

Every time the title selection switch 11 is pushed once, the selected title changes from one title over to another title according to the contents shown in FIG. 6.

A sequence of operations to be performed by the camera are next described below with reference to the flow chart of FIG. 8.

Referring to FIG. 8, when the main switch 3 of the camera is turned on, a flow of operation begins at a step S201. At the step S201, a check is made to find if the release button 9 has been pushed to its first stroke to turn on the switch SW1. If not, the flow waits at this step. When the switch SW1 is turned on, the flow proceeds from the step S201 to a step S202. At the step S202, the luminance of an object of shooting is measured by the light measuring circuit 5. At the next step S203, a distance to the object is measured by the distance measuring circuit 7. At a step S204, exposure data which can be used as reference in deciding a printing exposure and color correction to obtain a print is stored in the data storage circuit 25. The flow then proceeds from the step S204 to a step S205. The above-stated exposure data is information obtained from the measured light value and the measured distance value obtained at the steps S202 and S203. The exposure data thus include data as to whether to perform light emission of the flash device, data related to the luminance of the object and the distance to the object, etc.

At the next step S205, data of the print aspect ratio (PAR) selected by using the PAR switch 13 is stored in the data storage circuit 25. The flow then proceeds from the step S205 to a step S206. At the step S206, a check is made to find if the DATE switch 12, which is provided for recording a date or time, has been turned on. If not, the flow proceeds to a step S208. If so, the flow proceeds to a step S207. At the step S207, data of a recording mode selected by the DATE switch 12 (date or time in this case) is stored in the data storage circuit 25. The flow then proceeds to the step S208.

At the step S208, a check is made to find if the title on/off switch 10, which is provided for recording a title, has been turned on. If not, the flow proceeds to a step S212. If so, the flow proceeds to a step S209. At the step S209, a check is made to find if a title selected by the title selection switch 11 is of the first type. If so, the flow proceeds to a step S210.

At the step S210, a numeric code of the title selected is stored in the data storage circuit 25. The flow then proceeds from the step S210 to the step S212. At the step S212, photographing data of varied kinds including a shutter speed, an aperture value, a film sensitivity value, etc., is stored in the data storage circuit 25. After that, the flow proceeds to a step S213.

If the selected title is found at the step S209 to be not of the first type, i.e., to be of the second type, the flow proceeds from the step S209 to a step S211. At the step S211, a character code of the selected title is stored in the data storage circuit 25, and the flow proceeds to the step S213. In this instance, photographing data is not stored. This is because each title of the second type is set to be recorded in the same area on the photographic film as the photographing data and, in a case where any of the titles of the second type is to be recorded, use of this area for recording of the title has priority over recording of the photographing data.

At the step S213, a check is made to find if the release button 9 has been pushed to its second stroke to turn on the switch SW2. If not, the flow returns to the step S201. If so, the flow proceeds to a step S214. At the step S214, a photographing operation is performed as follows. An automatic focus control action is first performed by driving the photo-taking lens 2 through the automatic focus control part 8 on the basis of the result of the step S203. After that, the shutter control part 6 is driven to perform an exposure action on the film F on the basis of the result of the step S202.

At the next step S215, the transport motor driving circuit 17 is driven to begin a film transport action to bring the film F to the position of the next photo-taking frame. At the next step S216, the magnetic head 18 is driven through the magnetic recording circuit 19 to magnetically record, on the magnetic recording layer of the film F, information of varied kinds which has been temporarily stored in the data storage circuit 25. The flow then proceeds to a step S217. At the step S217, a check is made, through the photo-reflectors PR1 and PR2 and the film transport amount detecting circuit 23, to find if the film F has been transported to the extent of one frame amount thereof. If not, the flow waits until completion of the transport of the one frame amount. Upon completion of the film transport action, the flow proceeds to a step S218 to stop the driving action of the transport motor driving circuit 23 on the film transport motor 16. Camera actions to be performed on one frame amount of the film F then comes to an end.

Next, the state of magnetic recording performed on the film F at the step S216 of FIG. 8 is explained below with reference to FIG. 9.

Referring to FIG. 9, the illustration includes a first frame F1, a second frame F2 and a third frame F3 of the film F. In this case, the film F is assumed to have been exposed for photo-taking up to the third frame F3. Therefore, information corresponding to each of these frames is assumed to have been recorded.

The magnetic head 18 is illustrated at a position where it is located when the photographing operation on the second frame F2 is finished. The information corresponding to each of the frames is recorded divisionally into a first magnetic track T1 and a second magnetic track T2. Thus, the first frame F1 is provided with a first magnetic track T1-1 and a second magnetic track T2-1, the second frame F2 is provided with a first magnetic track T1-2 and a second magnetic track T2-2, and the third frame F3 is provided with a first magnetic track T1-3 and a second magnetic track T2-3. The two magnetic tracks T1 and T2 are formed respectively by the first channel C1 and the second channel C2 of the magnetic head 18.

The details of the magnetic recording provided at the first and third frames F1 and F3 are shown by way of example respectively at enlarged parts in FIG. 9. In the illustrated example, a title of the first type is recorded for the first frame F1. The magnetic information recorded in the first magnetic track T1 includes, in order, SS (start sentinel) information (of one byte) indicative of the start of the magnetic information, ID1 information (of one byte) indicative of the ID of date or time information, actual date or time data (of five bytes), ID2 information (of one byte) indicative of the ID of aspect ratio information, actual aspect ratio data (of one byte), ID3 information (of one byte) indicative of the ID of exposure data, actual exposure data (of two bytes), ID4 information (of one byte) indicative of the ID of the first type of titles, a language code (of one byte) indicative of a language (such as Japanese, English or German) used for the title, a numeric code (of one byte) of the title which is actually selected and recorded, and ES (end sentinel) information (of one byte) indicative of the end of the magnetic information. If the selected title is "Happy Birthday To You", a language code indicative of English and a numeric code "01" are recorded in the first magnetic track T1.

The magnetic information recorded in the second magnetic track T2 includes, in order, SS information (of one byte) indicative of the start of the magnetic information, ID5 information (of one byte) indicative of the ID of photographing data, actual photographing data (of ten bytes), and ES information indicative of the end of the magnetic information.

In the case of the example of magnetic information recorded for the third frame F3, a title of the second type is recorded for the third frame F3. In the first magnetic track T1 of the third frame F3, the magnetic information is recorded in about the same sequence as in the case of the first frame F1. However, since any title of the first type is not selected, the ID4 information, the language code and the numeric code of the title are not recorded in the first magnetic track T1 of the third frame F3. The magnetic information recorded in the second magnetic track T2 includes, in order, SS information (of one byte) indicative of the start of the magnetic information, ID6 information (of one byte) indicative of the ID of the second type of titles, a language code (of one byte) indicative of a language used for the title, title data expressed by a character code string which is formed by using one byte per character to indicate an actually selected and recorded title, and ES (end sentinel) information (of one byte) indicative of the end of the magnetic information. If the selected title is "Younger Brother's Birthday", a language code indicative of English and a character code of 26 bytes are recorded in the second magnetic track T2.

The camera according to the first embodiment permits recording of any desired title selected from among the titles of both the first type and the second type which are prestored. If a universally usable title is selected, the title can be simply recorded in a numeric code of one byte, thereby permitting effective utilization of a recording space. On the other hand, it is also possible to select and record a personal (nonuniversal) title. Further, it is an advantage of the first embodiment that the camera user is allowed to select any desired title without paying any heed to the difference between the first and second types of titles.

Further, since the content of a title is displayed, the selection of the title can be performed with a good operability. In addition, since the type of the title is also displayed, it is possible to effectively remind the camera user that no photographing data can be recorded when a title of the second type is selected.

The first embodiment is arranged to record, in the first recording track T1, a title of the first type which has a small amount of recording data together with other basic data (date or time data, aspect ratio data and exposure data) in one set, and to record, in the second magnetic track T2, a title of the second type which has a large amount of recording data in place of photographing data which is incidental data. Therefore, in a case where the recording capacity is limited as in the case of a photographic film, the first embodiment permits effective use of the limited recording capacity.

Figure 10:
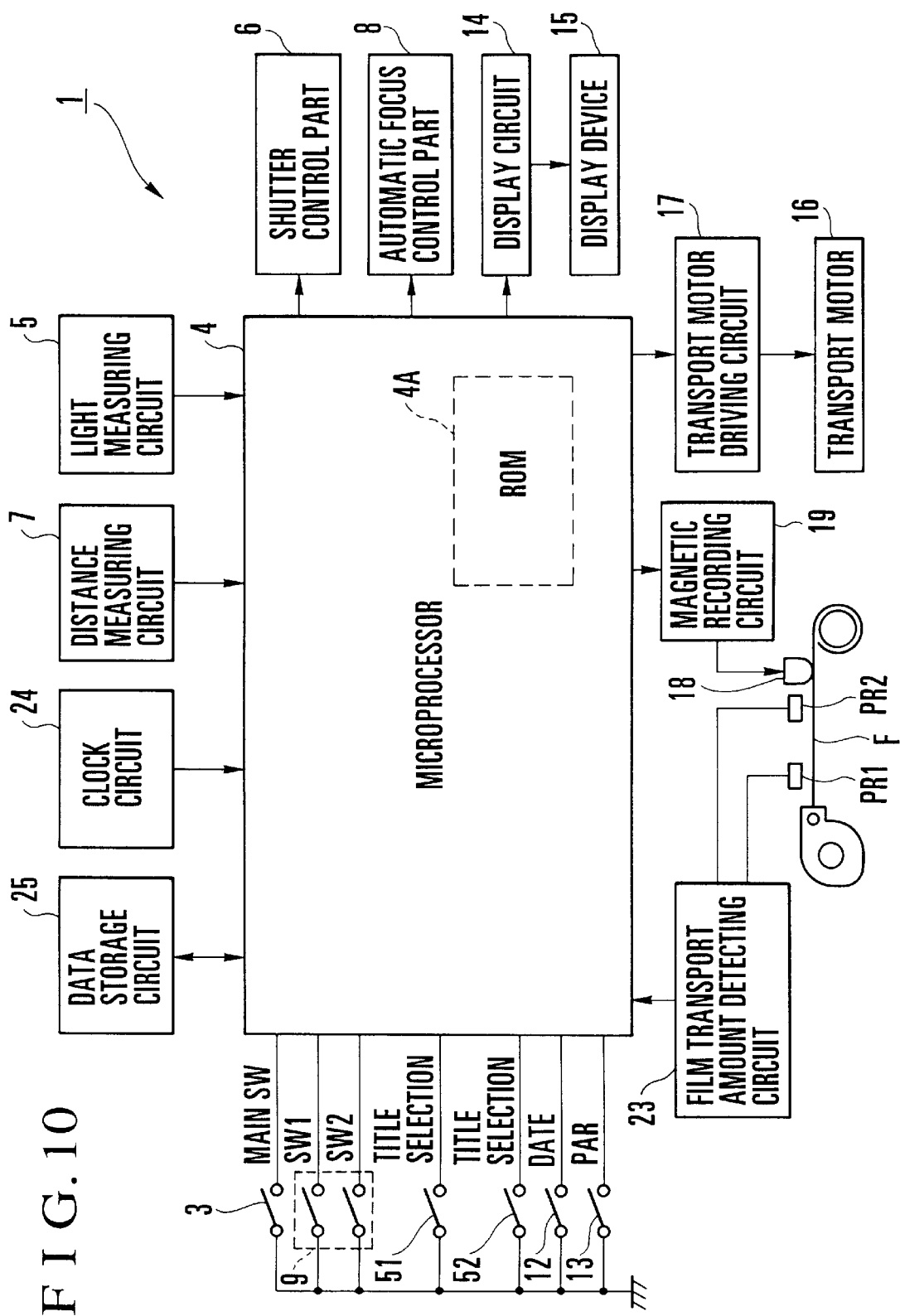
FIG. 10 is a block diagram showing the circuitry arrangement of a camera according to a second embodiment to the invention.

FIGS. 10 to 15 relate to a second embodiment of the invention. Of these figures, FIG. 10 is a block diagram showing the circuitry arrangement of a camera according to the second embodiment, and corresponds to FIG. 1 used for describing the first embodiment. In FIG. 10, all parts of the camera that are the same as those of the first embodiment are indicated by the same reference numerals as in FIG. 1, and the details of them are omitted from description.

Referring to FIG. 10, a title selection switch 51 is arranged to be used in selecting a desired title from among the titles of the first type. Another title selection switch 52 is arranged to be used in selecting a desired title from among the titles of the second type.

Figure 11:
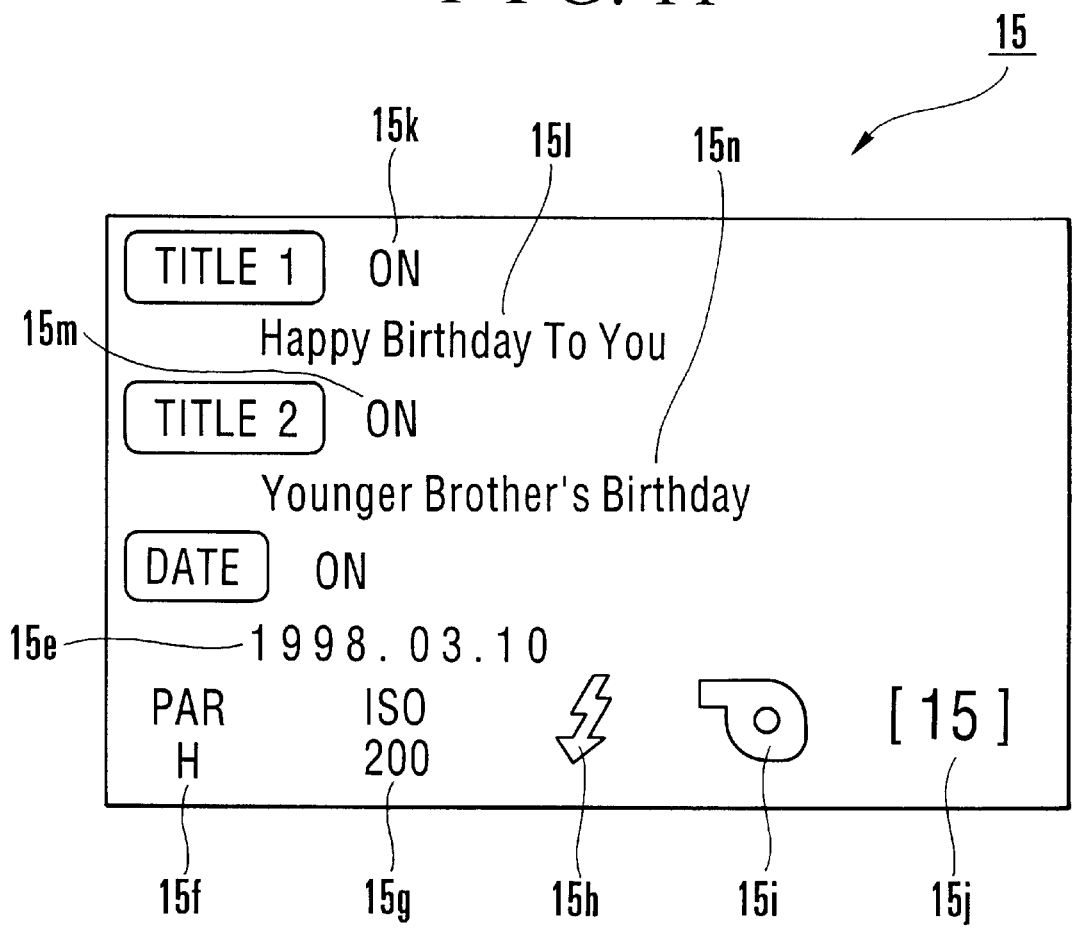
FIG. 11 is a diagram showing the contents of display to be made by a display device of the camera according to the second embodiment of the invention.

FIG. 11 shows the content of display to be made by the display device 15 shown in FIG. 10. In FIG. 11, all display parts that are the same as those shown in FIG. 4 are indicated by the same reference numerals as those used in FIG. 4.

Referring to FIG. 11, a first-type-title on/off display part 15$k$ is arranged to show whether the function of recording a title of the first type is in an on-state or in an off-state. A first-type-title display part 15$l$ is arranged to show the content of a title of the first type selected. A second-type-title on/off display part 15$m$ is arranged to show whether the function of recording a title of the second type is in an on-state or in an off-state. A second-type-title display part 15$n$ is arranged to show the content of a title of the second type selected.

FIGS. 12($a$) and 12($b$) show in tables the contents of the titles prestored in the ROM 4A shown in FIG. 10. FIG. 12($a$) shows the titles of the first type. In the table of FIG. 12($a$), there are defined, for each of the titles of the first type, an address on the ROM 4A assigned to the title and indicated in hexadecimal digits, a numeric code assigned to the title, and the content of the title.

FIG. 12($b$) shows the titles of the second type. In the table of FIG. 12($b$), there are similarly defined, for each of the titles of the second type, an address and the content of the title. In each of the tables of FIGS. 12($a$) and 12($b$), a leading address is assigned "no recording".

The meaning of the first and second types of titles is the same as in the first embodiment. A title of the first type is set to be recorded in a numeric code, and a title of the second type is set to be recorded in a character code, on the recording medium.

An operation to be performed in selecting a desired title is next described with reference to the flow chart of FIG. 13.

Figure 13:
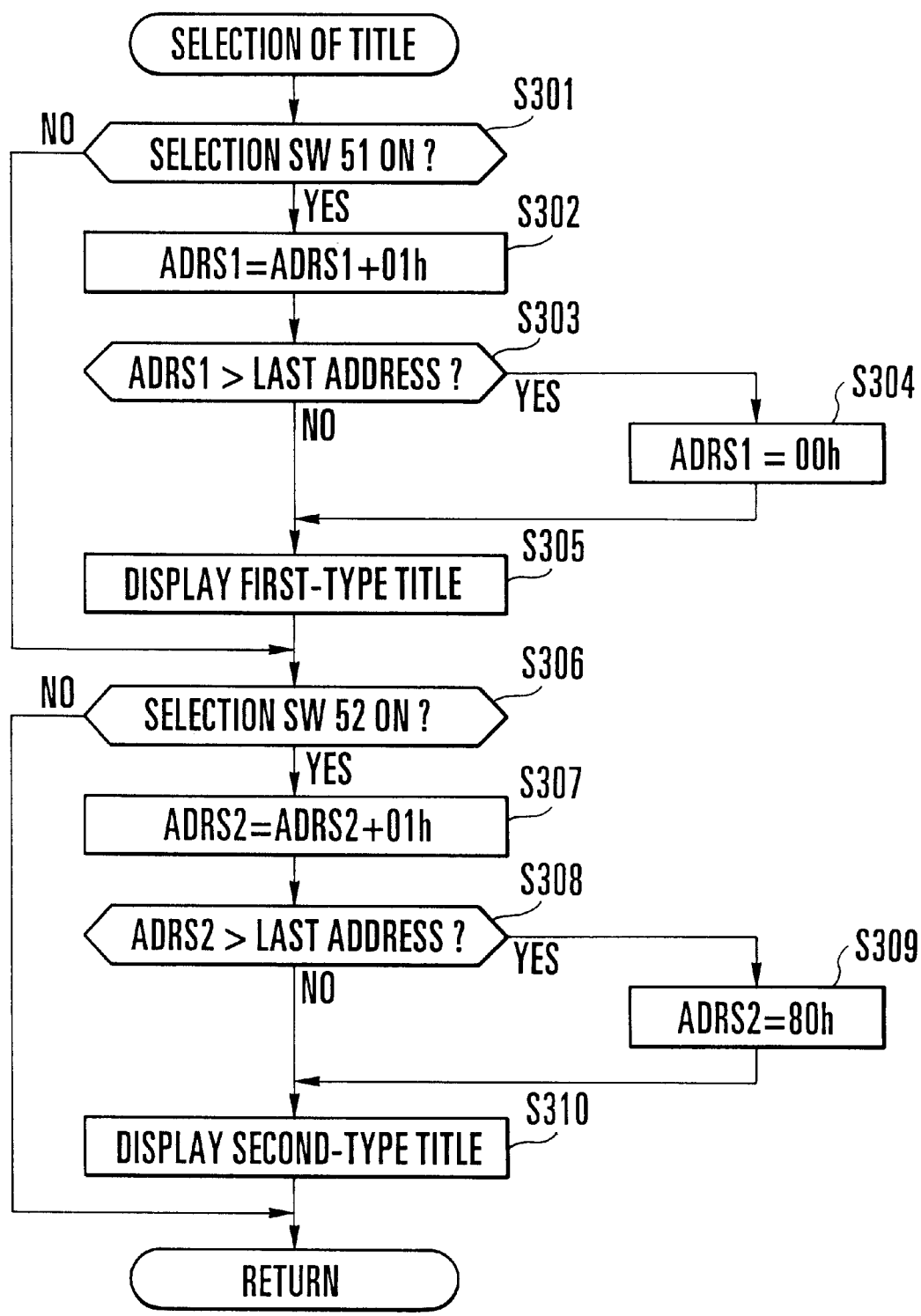
FIG. 13 is a flow chart showing a title selecting operation of the camera according to the second embodiment of the invention.

At a step S301 of FIG. 13, a check is made to find if the title selection switch 51 has been turned on. If not, the flow of operation proceeds to a step S306. If so, the flow proceeds to a step S302. At the step S302, an address is set by incrementing by one an address ADRS1 which has been set beforehand or set last time for a title of the first type. The flow then proceeds from the step 302 to a step S303. At the step S303, a check is made to find if the set address is larger than the last address shown in FIG. 12(a). If not, the flow proceeds to a step S305. At the step S305, a display is made at the display device 15 to show the content of the title of the incremented address and the fact that the function of recording a title of the first type is in an on-state. The flow then proceeds to the step S306.

If the address is found at the step S303 to be larger than the last address, the flow proceeds from the step S303 to a step S304. At the step S304, a leading address "00h" is set to the address ADRS1, and the flow proceeds to the step S305. At the step S305, the display device 15 is caused to make a display in the following manner. Since the leading address shows "no recording" in this case, "OFF" is shown at the display part 15k of the display device 15, and no display is made at the display part 15l.

At the step S306, a check is made to find if the title selection switch 52 has been turned on. If not, the flow returns to the start. If so, the flow proceeds to a step S307.

At the step S307, an address is set by incrementing by one an address ADRS2 which has been set beforehand or last time for a title of the second type. The flow then proceeds from the step S307 to a step S308. At the step S308, a check is made to find if the set address is larger than the last address shown in FIG. 12(b). If not, the flow proceeds to a step S310. At the step S310, the display device 15 is caused to make a display to show the content of the title of the incremented address and the fact that the function of recording a title of the second type is in an on-state. The flow then returns to the start.

If the address is found at the step S308 to be larger than the last address, the flow proceeds to a step S309. At the step S309, a leading address "80h" shown in FIG. 12(b) is set to the address ADRS2. Then, the flow proceeds to the step S310 to cause the display device 15 to display "OFF" at the display part 15m and to display nothing at the display part 15n.

In the second embodiment, the selection of one of the titles of the first type is performed according to the contents of FIG. 12(a) every time the title selection switch 51 is pushed once, and the selection of one of the titles of the second type is performed according to the contents of FIG. 12(b) every time the title selection switch 52 is pushed once.

Further, it is possible to select two titles at the same time, one from among the titles of the first type and the other from among the titles of the second type.

Figure 14:
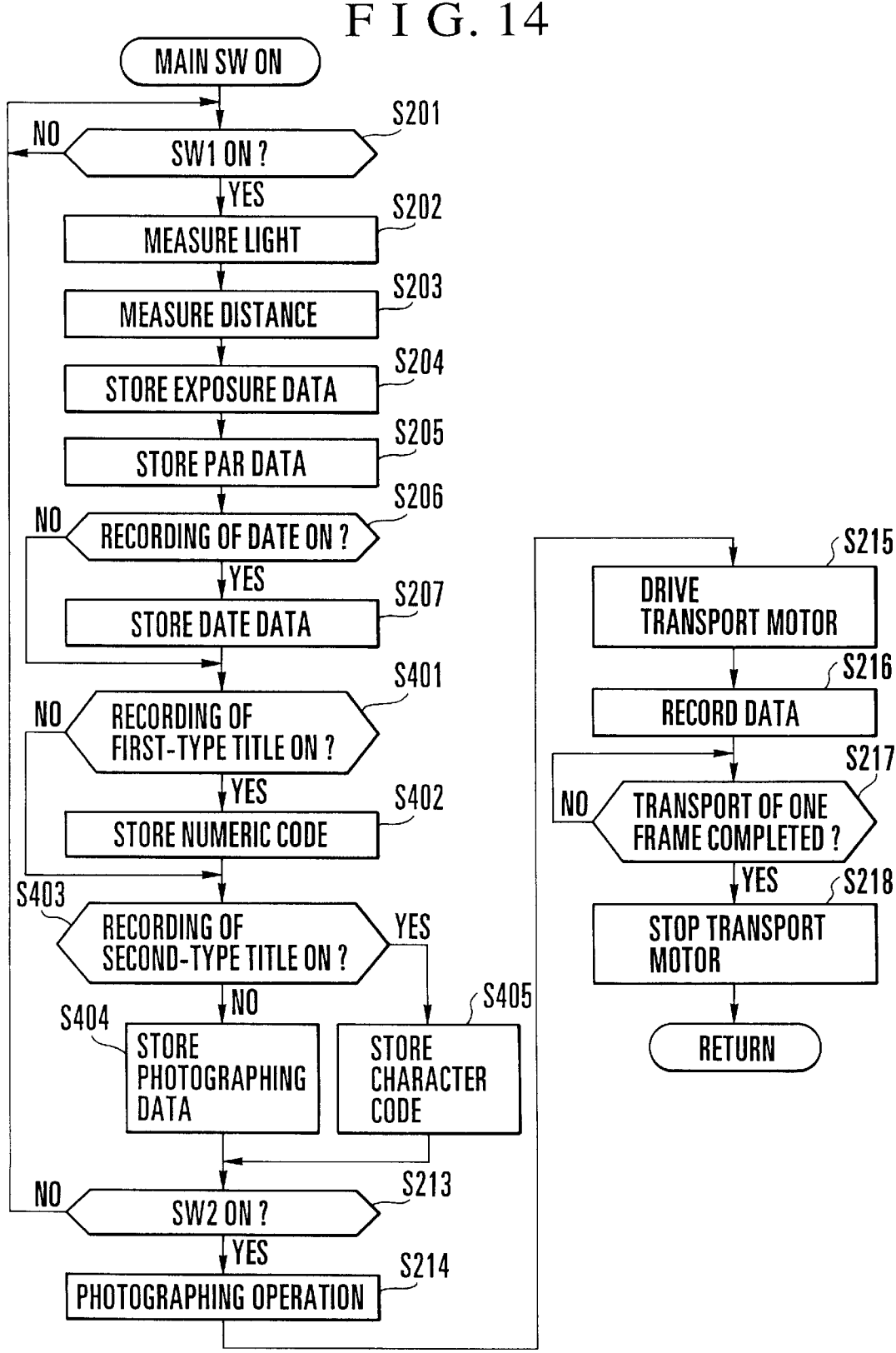
FIG. 14 is a flow chart showing a sequence of operations of the camera according to the second embodiment of the invention.

Next, a sequence of operations of the camera according to the second embodiment of the invention is described below with reference to the flow chart of FIG. 14. Steps S201 to S207 shown in FIG. 14 are identical with the actions of the first embodiment shown at the steps S201 to S207 in FIG. 8. The steps S207 to S207 are, therefore, omitted from the following description.

At a step S401 of FIG. 14, a check is made to find if the function of recording a title of the first type is turned on by the title selection switch 51. If not, i.e., if it is found off, the flow proceeds to a step S403. If so, the flow proceeds to a step S402. At the step S402, a numeric code of the title selected by the title selection switch 51 is stored in the data storage circuit 25. The flow then proceeds from the step S402 to the step S403.

At the step S403, a check is made to find if the function of recording a title of the second type is turned on by the title selection switch 52. If not, the flow proceeds to a step S404.

If so, the flow proceeds to a step S405. At the step S404, photographing data of varied kinds, such as a shutter speed, an aperture value, a film sensitivity value, etc., is stored in the data storage circuit 25. The flow then proceeds from the step S404 to a step S213.

In a case where the flow proceeds from the step S403 to the step S405, a character code of the title selected by the title selection switch 52 is stored in the data storage circuit 25, and the flow proceeds to the step S213. In this instance, the step S404 of storing the photographing data is skipped, as in the case of the first embodiment, because a title of the second type is set to be recorded in the same area on the photographic film as the photographing data and, in a case where one of the titles of the second type is to be recorded, use of this area for recording of the title has priority over recording of the photographing data.

The step S213 and steps subsequent to the step S213 are omitted from description as they are similar to the steps S213 to S218 in the first embodiment described in the foregoing with reference to FIG. 8.

Figure 15:
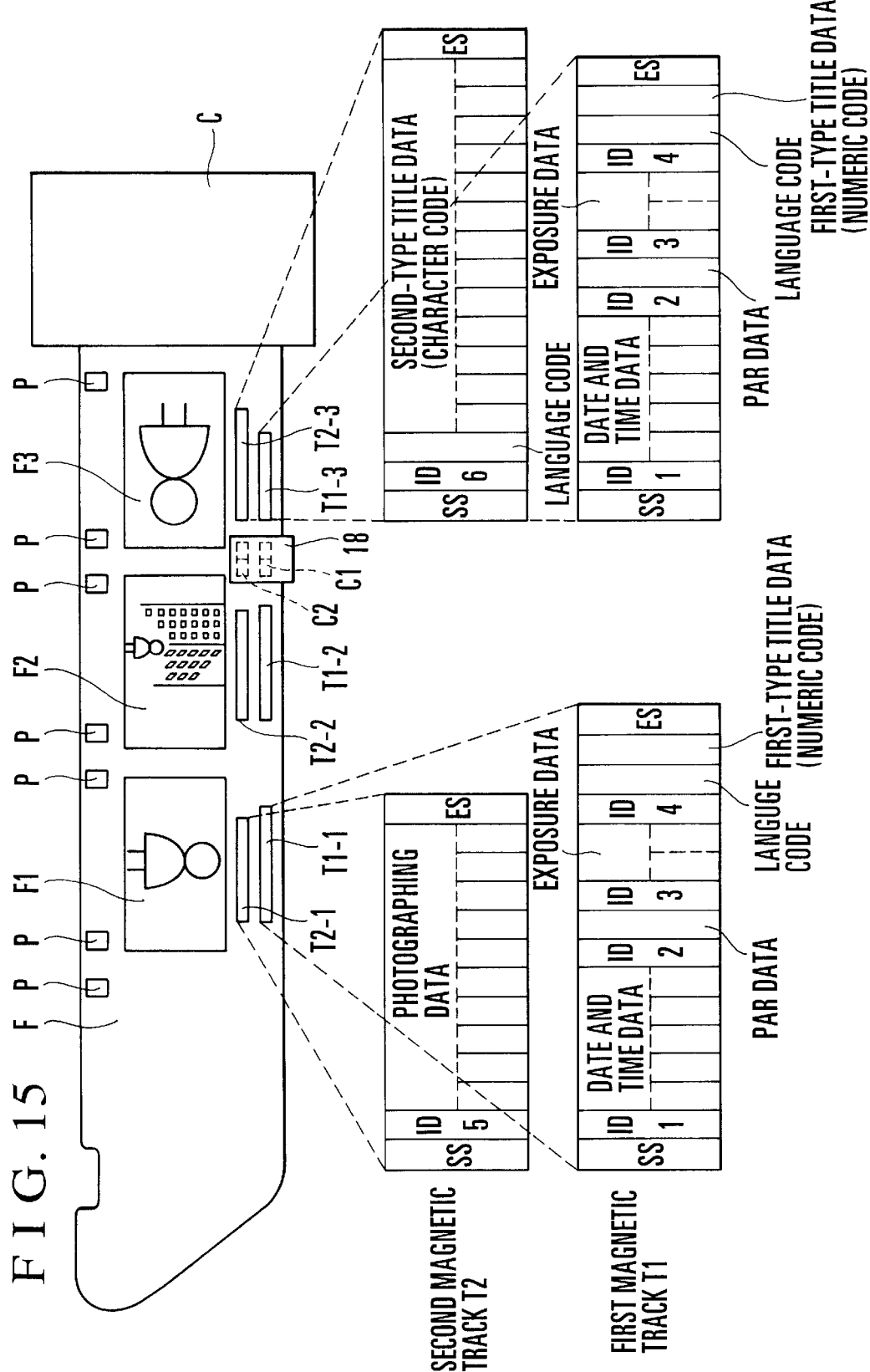
FIG. 15 is a diagram for explaining a recording operation of the camera according to the second embodiment of the invention.

FIG. 15, which corresponds to FIG. 9 used for describing the first embodiment, shows the state of magnetic recording performed on the film F at the step S216 in FIG. 14.

The details of the magnetic recording provided at the first frame F1, which are shown by way of example in an enlarged state in FIG. 15, show a case where a title of the first type is selected and recorded for the first frame F1. Therefore, the magnetic information for the first frame F1 is recorded in exactly the same manner as in the case of the first embodiment shown in FIG. 9.

In the case of the magnetic information recorded for the third frame F3, both a title of the first type and a title of the second type are recorded for the frame F3. The magnetic information recorded in the first magnetic track T1 includes, in order, SS (start sentinel) information (of one byte) indicative of the start of the magnetic information, ID1 information (of one byte) indicative of the ID of date or time information, actual date or time data (of five bytes), ID2 information (of one byte) indicative of the ID of aspect ratio information, actual aspect ratio data (of one byte), ID3 information (of one byte) indicative of the ID of exposure data, actual exposure data (of two bytes), ID4 information (of one byte) indicative of the ID of the first type of titles, a language code (of one byte) indicative of a language (such as Japanese, English or German) used for the title, a numeric code (of one byte) of the title which is actually selected and recorded, and ES (end sentinel) information (of one byte) indicative of the end of the magnetic information. If the selected title is "Happy Birthday", a language code indicative of English and a numeric code "02" are recorded in the first magnetic track T1.

The magnetic information recorded in the second magnetic track T2 includes, in order, SS information (of one byte) indicative of the start of the magnetic information, ID6 information (of one byte) indicative of the ID of the second type of titles, a language code (of one byte) indicative of a language used for the title, title data expressed by a character code string which is formed by using one byte per character to indicate an actually selected and recorded title, and ES (end sentinel) information (of one byte) indicative of the end of the magnetic information. If the selected title is "Younger Brother's Birthday", a language code indicative of English and a character code of 26 bytes are recorded in the second magnetic track T2.

The second embodiment is arranged to permit simultaneous recording up to two titles, one selected from among the titles of the first type prestored and the other from among the titles of the second type prestored. This arrangement is an advantage of the second embodiment over the first embodiment.

Figure 16:
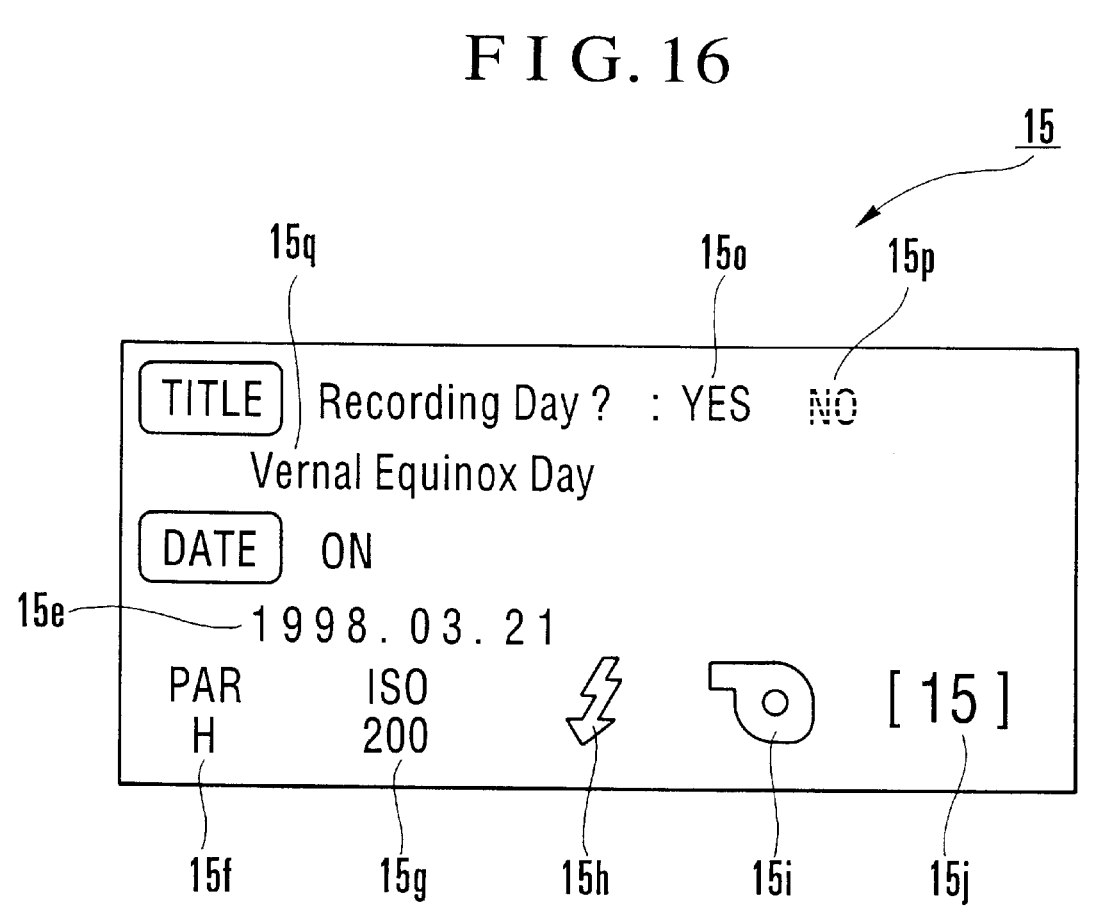
Figure 18:
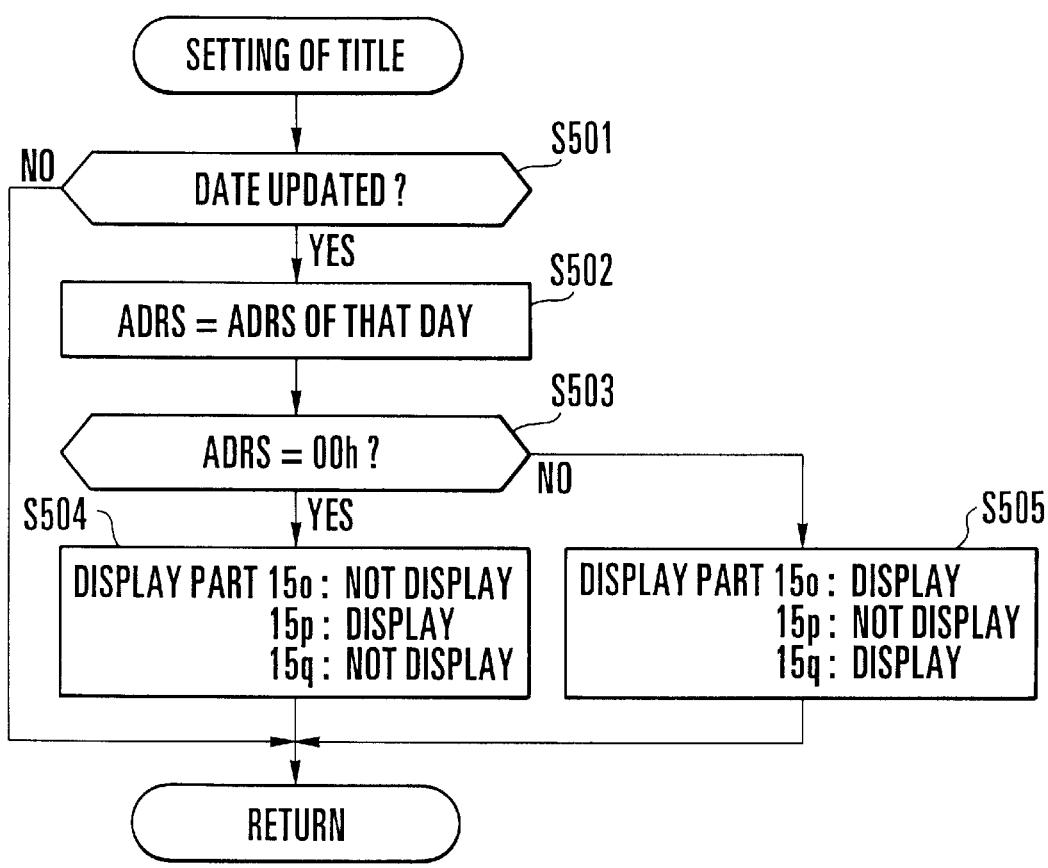
FIG. 18 is a flow chart showing a title setting operation of the camera according to the third embodiment of the invention.

FIGS. 16 to 18 relate to a third embodiment of the invention. A feature of the third embodiment lies in that a title is automatically decided and recorded when a date or time is decided. The arrangement of a camera suited for the third embodiment is about the same as the arrangement of the first embodiment, except that the third embodiment dispenses with the title recording on/off switch 10 and the title selection switch 11.

FIG. 16 shows the contents of display to be made by the display device 15 according to the third embodiment. In FIG. 16, all display parts that are the same as those of the first embodiment shown in FIG. 4 are indicated by the same reference numerals as in FIG. 4.

In FIG. 16, there are illustrated segments (display parts) 15o and 15p which are arranged to show whether the current date is a day for which a title is to be recorded. If so, "YES" is displayed at the segment 15o. If not, "NO" is displayed at the segment 15p. In the case of a day for which a title is to be recorded, the content of the title to be recorded is displayed at a display part 15q.

FIG. 17 shows in a table the contents of titles prestored in the ROM 4A according to the third embodiment of the invention.

In FIG. 17, specific dates are correlated with titles. The table of FIG. 17 includes specific dates, the addresses of the ROM 4A which are arranged for the titles and indicated in hexadecimal digits, types of titles, numeric codes assigned to the titles, the contents of the titles, and amounts of recording data required in recording the respective titles. An address "00h" is assigned to an undefined date, and no title is recorded for any such undefined date.

Similarly to the case of FIG. 6 in the first embodiment, the titles shown in FIG. 17 are arranged to be divided into titles of the first type and titles of the second type. This arrangement enables a great number of kinds of titles to be correlated to specific dates.

For example, an address "0Fh" is for "Greenery Day" which is recently established as one of national holidays of Japan. If the title for this specific date is set as a title of the first type, it is difficult to have compatibility with a photograph printer, a CRT monitor apparatus or the like. However, that title can be correlated to this date by prestoring that title as a title of the second type.

Next, the operation for setting a title to be recorded is described below with reference to the flow chart of FIG. 18.

At a step S501 of FIG. 18, a check is made to find if the date has been updated by the clock circuit 24 (the next day has come). If not, the flow of operation returns to the start. If so, the flow proceeds to a step S502. At the step S502, an address which corresponds to the updated date is set according to the table of FIG. 17. At the next step S503, a check is made to find if the set address is "00h" (no recording). If so, the flow proceeds to a step S504.

At the step S504, the display circuit 14 is caused to drive the display device 15 to make no display at the display part 15o and make a display at the display part 15p indicating that the present date is a day for which no title is recorded, and to make no display at the display part 15q. The flow then returns to the main flow of operation.

On the other hand, if the set address is found at the step S503 to be not the address "00h", the flow proceeds to a step S505. At the step S505, the display circuit 14 is caused to drive the display device 15 to make a display at the display part 15o and make no display at the display part 15p indicating that the present date is a day for which a title is recorded, and to display the content of the applicable title at the display part 15q. The flow then returns to the main flow of operation.

The third embodiment described above is arranged to automatically decide whether or not the recording of a title is to be performed and, in recording a title, to automatically decide the content of the title according to the date.

The operations to be performed by the camera in the third embodiment, including the above-stated recording of a title, are similar to those of the first embodiment shown in the flow chart of FIG. 8. However, the operations of the third embodiment differ from those of the first embodiment in the following point.

In the first embodiment, a check is made to find whether the title recording function is in an on-state or in an off-state by the state of the title recording on/off switch 10 at the step S208 of FIG. 8. However, in the case of the third embodiment, a check for the on/off state of the title recording function is made by finding if the address currently set is the address "00h".

As in the case of the first embodiment, the third embodiment is arranged to store in the data storage circuit 25 a numeric code when a title to be recorded is of the first type and a character code when the title is of the second type (steps S210 and S211). When a title of the second type is recorded, photographing data is not stored and, therefore, not recorded (skipping the step S212), in the same manner as in the first embodiment.

The state of magnetic recording on the film F obtained in the third embodiment is the same as in the case of the first embodiment, as shown in FIG. 9. For example, if the date of photo-taking is April 12, "Easter", which is a title of the first type, is recorded. In this instance, the recording state is the same as the example of recording for the first frame F1 shown in FIG. 9. If the date of photo-taking is April 29, "Greenery Day", which is a title of the second type, is recorded. In that instance, the recording state is the same as the example of recording for the third frame F3 shown in FIG. 9.

According to the above-stated arrangement of the third embodiment, since a title of the first or second type apposite to a specific date is prestored, the best title can be recorded without any additional operation in taking a picture.

Further, the third embodiment is arranged to make a display indicating that a title will be recorded on each title recording day. This arrangement enables the camera user to know, with ease, whether or not a title will be recorded. Further, if the correlation between titles and respective specific dates is made clear to the camera user, the display part 15q (see FIG. 16), which is provided for showing the content of a title on the display device 15, can be dispensed with for reduction in size and cost of the display device.

While the third embodiment is arranged to make the title on/off switch 10 unnecessary, this arrangement may be changed to have the title on/off switch 10 also included in the camera to be operated when it is not desired to record any applicable title in taking a picture on one of the title recording days. Further, according to the invention, a camera may be arranged to have the function of recording a title in correlation with a specific date, as in the third embodiment, in combination with the function of selecting and recording a title, as in the first or second embodiment.

The advantages of the embodiments described in the foregoing are recapitulated as follows.

1) According to the invention, not only the titles of the first type which are universal and impersonal and have compatibility with an external apparatus such as a photograph printer, a CRT monitor apparatus (as the numeric codes are well correlated with the contents of titles) but also the titles of the second type which are to be recorded with one character code used for one character are stored in a storage means such as a ROM or the like. Therefore, unlike the conventional arrangement of storing only impersonal titles such as the titles of the first type, personal titles can be also selected for recording in accordance with the invention.

2) In this instance, not both of the title of the first type and the title of the second type are stored with one character code used for each character, but the title of the first type is stored and recorded in a numeric code, so that the required recording capacity on the film can be minimized.

3) As for the titles of the second type, instead of inputting each of the titles of the second type by an external operation on the camera, a maximum possible number of titles of high rates of usage frequency are prestored to ensure good operability of the camera. Further, the arrangement for storing titles in languages usable in various regions of the world further enhances the operability of the camera.

4) The first embodiment is arranged to store the titles of the first type and the titles of the second type without separating them by types. The arrangement permits the camera user to select any of these titles as desired irrespective of the difference between the impersonal titles and the personal titles.

5) The second embodiment is arranged to store the titles of the first type and the titles of the second type by dividing them by types. In addition, switches are provided respectively for selection of a title of the first type and for selection of a title of the second type. The selection switches are arranged also to permit selection of every one title from the titles of the first type and the titles of the second type so as to select a total of two titles according to necessity (for example, the two titles are correlated with each other). By virtue of this arrangement, titles can be recorded in closer conformity with the intention of the camera user by a simple operation.

6) The third embodiment is arranged to prestore each of the titles of the first type and the titles of the second type in correlation with corresponding date information (date, time or the like). In taking a picture at one of the specific dates, a title of the first type or second type correlated to the specific date can be automatically selected and recorded. This arrangement saves the camera user from the trouble of selecting a title or from forgetting the title selection. Besides, a desired title can be selected for recording from among a great number of kinds of titles.

7) Further, in automatically recording a title of the first type or second type correlated to a specific date, a display is made to show that the title recording is being performed. The operability of the camera is improved further by that arrangement.

8) The arrangement for displaying the title being recorded or being selected enables the camera user to know the content of the title prior to recording of the title. The title thus can be recorded with an excellent operability.

In the cases of the tables shown in FIG. 6, FIGS. 12(a) and 12(b) and FIG. 17 in the respective first to third embodiments, the contents of the titles of the first type are stored within the ROM 4A to permit a display of the content of a selected title on the display device 15. This arrangement, however, may be changed to only store the numeric codes of the titles without storing the contents of the titles. In that case, the display device 15 is arranged to display the numeric code of a selected title, while correlation between the titles and numeric codes may be arranged to be found, for example, through an instruction manual for the camera.

Further, in the first to third embodiments, an explanation is made about a camera arranged to record a taken image optically and a title magnetically on a single photographic film serving as a recording medium. However, since the object of the invention can be attained by prestoring the titles of the first type and the titles of the second type, the advantage of the invention can be attained likewise by arranging a camera to have both a taken image and a title either electrically or magnetically recorded.

In accordance with the invention, a camera may be provided with a title type selecting switch arranged to permit selection of either the titles of the first type or the titles of the second type, a first-type-title selecting switch arranged to permit selecting one of the titles of the first type as selected by the title type selecting switch, and a second-type-title selecting switch arranged to permit selection of one of the titles of the second type as selected by the title type selecting switch. These selecting switches correspond to the switches 51 and 52 shown in FIG. 10.

As described above, according to each embodiment of the invention, a camera can be arranged to minimize a recording capacity on a recording medium and yet to be capable of recording a desired title selected from among a great number of kinds of titles.

Further, according to each embodiment of the invention, a camera can be arranged to permit selecting and recording a desired title not only from among the titles of the first type of impersonal nature having compatibility with an external apparatus but also from among the titles of the second type of personal nature.

Further, according to each embodiment of the invention, a camera can be arranged to permit the camera user to select a desired title without necessitating the camera user to discriminate between the title of the first type and the title of the second type.

Further, according to each embodiment of the invention, a camera can be arranged to be capable of simultaneously recording a plurality of titles by selecting one title from the titles of the first type and selecting one title from the titles of the second type.

Further, according to each embodiment of the invention, a camera can be arranged to be capable of automatically recording a title of the first type or a title of the second type on the basis of correlation of the title with a specific applicable date.

Further, according to each embodiment of the invention, a camera can be arranged to have an excellent operability by allowing the camera user to know the content of a title to be recorded.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data recording apparatus adapted for a camera, comprising:

a recording device which records data on an image recording medium; and a data recording control device which causes said recording device to perform (i) a first recording operation for recording, on the image recording medium, title data of a first type composed of a numeric code which has compatibility with an external apparatus and is defined as a title composed of a plurality of characters, and (ii) a second recording operation for recording, on the image recording medium, title data of a second type formed by combining a plurality of character codes each of which is defined to correspond to one character in conformity to a predetermined character standard.

2. A data recording apparatus according to claim 1, wherein said data recording control device includes a memory which stores beforehand the title data of the first type and the title data of the second type.

3. A data recording apparatus according to claim 2, wherein said memory includes means for storing beforehand, as the title data of the second type, title data corresponding to titles not defined as the title data of the first type.

4. A data recording apparatus according to claim 2, wherein said data recording control device includes selection means for selecting, from data stored in said memory, data to be recorded by said recording device.

5. A data recording apparatus according to claim 4, wherein said selection means includes means for selecting, as the data to be recorded by said recording device, at least one of the title data of the first type stored in said memory and at least one of the title data of the second type stored in said memory.

6. A data recording apparatus according to claim 5, wherein said memory includes means for storing beforehand a plurality of title data of the first type and a plurality of title data of the second type, and said selection means includes means for selecting, as the data to be recorded by said recording device, at least one of the plurality of title data of the first type stored in said memory and at least one of the plurality of title data of the second type stored in said memory.

7. A data recording apparatus according to claim 2, wherein said memory includes means for storing a plurality of title data of the first type.

8. A data recording apparatus according to claim 7, wherein said data recording control device includes selection means for selecting, from the plurality of title data of the first type stored in said memory, data to be recorded by said recording device.

9. A data recording apparatus according to claim 2, wherein said memory includes means for storing a plurality of title data of the second type.

10. A data recording apparatus according to claim 9, wherein said data recording control device includes selection means for selecting, from the plurality of title data of the second type stored in said memory, data to be recorded by said recording device.

11. A data recording apparatus according to claim 4, wherein said selection means includes means for selecting data to be recorded by said recording device, according to time counted by time count means.

12. A data recording apparatus according to claim 11, wherein said selection means includes means for selecting, as the data to be recorded by said recording device, predetermined title data of the first type from among data stored in said memory in response to the time counted by said time count means reaching a first time, and for selecting, as the data to be recorded by said recording device, predetermined title data of the second type from among data stored in said memory in response to the time counted by said time count means reaching a second time different from the first time.

13. A data recording apparatus according to claim 4, further comprising a display device which displays what is the data selected by said selection means.

14. A data recording apparatus according to claim 1, wherein said recording device includes means for recording data by a magnetic action.

15. A data recording apparatus according to claim 1, wherein said recording device includes means for recording data in a first position of the image recording medium in recording the title data of the first type, and recording data in a second position of the image recording medium different from the first position in recording the title data of the second type.

16. A data recording apparatus according to claim 14, wherein said recording device includes means for recording data in a first recording track of the image recording medium in recording the title data of the first type, and recording data in a second recording track of the image recording medium different from the first recording track in recording the title data of the second type.

17. A camera comprising:

a recording device which records data on an image recording medium; and a data recording control device which causes said recording device to perform (i) a first recording operation for recording, on the image recording medium, title data of a first type composed of a numeric code which has compatibility with an external apparatus and is defined as a title composed of a plurality of characters, and (ii) a second recording operation for recording, on the image recording medium, title data of a second type formed by combining a plurality of character codes each of which is defined to correspond to one character in conformity to a predetermined character standard.

* * * * *